United States Patent [19]

Lyons

[11] 4,036,719
[45] *July 19, 1977

[54] IRRADIATABLE POLYMER COMPOSITION WITH IMPROVED OXIDATION RESISTANCE

[75] Inventor: Bernard J. Lyons, Atherton, Calif.

[73] Assignee: Raychem Corporation, Menlo Park, Calif.

[*] Notice: The portion of the term of this patent subsequent to July 29, 1992, has been disclaimed.

[21] Appl. No.: 592,243

[22] Filed: July 1, 1975

Related U.S. Application Data

[63] Continuation-in-part of Ser. No. 405,521, Oct. 11, 1973, abandoned.

[51] Int. Cl.² .............................................. C08F 8/00
[52] U.S. Cl. .......................... 204/159.14; 204/159.16;
204/159.2; 260/45.7 P; 260/45.8 A
[58] Field of Search ..................... 204/159.14, 159.16, 204/159.2; 260/45.8 A, 45.7 P

[56] References Cited

U.S. PATENT DOCUMENTS

| 3,039,993 | 6/1962 | Friedman | 260/45.8 R |
|---|---|---|---|
| 3,047,608 | 7/1962 | Friedman et al. | 260/45.8 R |
| 3,053,878 | 9/1962 | Friedman et al. | 260/45.8 R |
| 3,310,609 | 3/1967 | Baranauckas et al. | 260/45.8 R |
| 3,440,212 | 4/1969 | Tholstrup | 260/45.8 R |
| 3,627,658 | 12/1971 | Ryffel | 204/159.2 |
| 3,737,485 | 6/1973 | Hechenbleikner | 260/45.8 R |
| 3,888,752 | 6/1975 | Eldred | 204/159.2 |
| 3,897,388 | 7/1975 | Lyons | 260/45.8 R |
| 3,922,249 | 11/1975 | Mills | 260/45.8 R |

*Primary Examiner*—Melvyn I. Marquis
*Attorney, Agent, or Firm*—Lyon & Lyon

[57] ABSTRACT

An irradiation cross-linked polymer composition having improved oxidation resistance is disclosed. Improved oxidation resistance is obtained by utilizing an organic phosphite which is relatively insoluble and unreactive under irradiation conditions so as to be unaffected by the irradiation.

12 Claims, No Drawings

IRRADIATABLE POLYMER COMPOSITION WITH IMPROVED OXIDATION RESISTANCE

CROSS-REFERENCES TO RELATED APPLICATIONS

This is a continuation-in-part of my co-pending application Ser. No. 405,521 filed Oct. 11, 1973 and now abandoned.

BACKGROUND OF THE INVENTION

This invention relates to a polymer composition suitable for applications requiring irradiation of the polymer, for example with ionizing radiation, wherein the antioxidant ingredient of the polymer composition is substantially unaffected by such irradiation.

It is known that various thermoplastic polymers upon irradiation, will undergo a degree of cross-linking, thereby substantially changing the plastic properties. A particular property which may be imparted to a thermoplastic upon irradiation is that of heat-recoverability. Heat-recoverability may be obtained by irradiation and deformation of the polymer such that upon subsequent heating it may be caused to shrink or expand. Methods of making heat-recoverable polymers by irradiation are generally described in U.S. Pat. Nos. 3,597,372, 3,396,460 and 3,297,819.

Any effective source of ionizing radiation is suitable. Thus one can employ a high energy electron accelerator of the Van de Graaff or other types. Other suitable sources of ionizing radiation include x-rays or gamma radiation, e.g., Co-60. The amount of radiation required can vary widely depending upon the particular substrate used, and the degree of cross-linking desired. The quantity of radiation should be an amount sufficient to cause the desired amount of cross-linking, the degree of cross-linking be sufficient to substantially affect being physical or chemical properties of the material. For example, 1 to 50 mrads show good results with most polymer compositions to effect a sufficient degree of cross-linking to render the material heat-shrinkable. However, a sufficient degree of cross-linking can be achieved with an even lesser amount of radiation where cross-linking can be sustained via another source. For example, effective amounts of cross-linking can be achieved by initiating cross-linking via small doses of radiation, after which propagation of the reaction can be sustained through other agents, such as monomers.

Particularly suited for such irradiation applications are polyolefin polymers and ethylene copolymers. These may include: polyethylene, polypropylene, ethylene-vinyl acetate copolymer, ethylene-acrylic ester copolymers, ethylene-propylene copolymer, ethylene-propylene-diene terpolymer. Other thermoplastics which undergo or may be caused to undergo cross-linking upon irradiation include: polyvinylchloride, polyvinylidenechloride, polyvinylidenefluoride, and chlorinated polyethylene.

Unfortunately, although olefin polymers are easily caused to cross-link upon irradiation, they are also subject to severe deterioration from the oxidative action of air at elevated temperatures. Both the oxidation of a polyolefin, and the cross-linking of a polyolefin upon irradiation involves a free radical reaction mechanism. Antioxidants generally function by scavenging free radicals which otherwise would initiate oxidation of the plastic. Free radicals may be formed from various energy sources such as exposure to heat or light. As soon as a free radical is formed, it is scavenged by the antioxidant prior to propagating an oxidation reaction with the plastic.

Irradiation of a polymer such as a thermoplastic polyolefin to cause a degree of cross-linking also proceeds via a free radical mechanism. Thus, it has been necessary to incorporate large amounts of antioxidant into a polymer system which is to be irradiated to insure that oxidative degradation will not occur at elevated temperatures. As a result of the incorporation of a large percentage of antioxidant into the polymer system, a greater amount of irradiation may be necessary to cause cross-linking, since such antioxidants scavenge polymer free radicals resulting from the irradiation before they can crosslink. On the other hand, where lower levels of antioxidant are used, they may be consumed or rendered ineffective during the irradiation step so that the polymer composition will readily undergo oxidation during service at elevated temperatures. Such oxidative deterioration at elevated temperatures is manifested by discoloration, surface crazing, cracking, and ultimately complete embrittlement. It is thus an object of this invention to provide a polymer composition which will readily undergo cross-linking upon irradiation without the excessive scavenging of polymer free radicals by the antioxidant as was a problem with prior art antioxidants, yet will not undergo oxidation at elevated temperatures during the service life of the polymer system.

SUMMARY OF THE INVENTION

A polymer composition containing an effective amount of antioxidant which does not prevent the formation of free radicals and their subsequent reaction to form crosslinks under irradiation conditions to any significant extent yet functions as a free radical scavenger to prevent oxidation of the polymer at elevated temperatures. By incorporating a substantially insoluble organic phosphite into a polymer which will undergo or may be caused to undergo cross-linking upon irradiation, cross-linking is readily achieved without affecting the antioxidant properties of the organic phosphite.

The organic phosphite contemplated for use in this invention is one having the general formula $R_1O(ROPOR')_nA_x$ wherein the R and R' radicals may be the same or different, and may alone or in combination comprise the group consisting of alkyl, substituted alkyl, aryl, substituted aryl, and may together form a ring and contain further phosphite moieties, $R_1$ is alkyl, substituted alkyl, aryl, substituted aryl, or hydrogen and may contain further phosphite moieties and A is hydrogen or $OR_1$, wherein $n$ is 1 or 2, $x$ is 0 or 1, and in which the compound remains a relatively insoluble crystalline or amorphous solid when combined with a polymer and exposed to irradiation conditions. Particularly suitable for use in these polymer systems are organic phosphites which are derivatives of pentaerythritol, dipentaerythritol, and tripentaerythritol.

PREFERRED EMBODIMENT

Contemplated by this invention are cross-linked polymer compositions containing an effective amount of organic phosphites which remain substantially insoluble under irradiating conditions.

By substantially insoluble is meant a compound in which, under an amount of ionizing radiation generally suitable to cause cross-linking in polymers, as for example 1 to 50 mrads, a major portion of the compound will remain a crystalline or glassy solid, unreactive and unaffected under such radiation. However, at elevated temperatures above that temperature at which irradiation cross-linking occurs, the antioxidant performs to prevent free radical propagation causing oxidative degradation of the plastic.

By effective level of antioxidant is meant that amount of antioxidant which will prevent deterioration of the composition over extended periods of time at the service temperature to which the composition is to be subjected. The effective level of antioxidant will be dictated by a number of considerations including the particular polymer, its thickness and opacity. By use of insoluble organic phosphites, I have found that generally less than 3% antioxidant is required in compounding irradiation cross-linked compositions. The effective level of antioxidant is generally between 0.1 and 3% organic phosphite, and more specifically, between 1 and 3%.

EXAMPLE I

1% by weight of various phosphite antioxidants were blended with a low density polyethylene (DFD 6005, Union Carbide Corporation, density 0.930, M.I. 0.2) on a mill at 160° C and hydraulically pressed into 6 in. by 6 in. by 0.020 in. slabs at 170° C, cooled to room temperature and irradiated to a dose of 15 Mrads. The modulus of elasticity of the samples at 150° C, which is directly proportional to the cross-linking density (see A. Charlesby, *Atomic Radiation and Polymers*, Pergamon Press, New York, 1960, page 151), was determined by the method of R. M. Black (*The Electrical Manufacturer*, October, 1957).

The antioxidants evaluated consisted of organic phosphites obtained from the Weston Chemical Company, a subsidiary of Borg Warner Corporation and are designated as follows:

A. Weston 243B phosphite is a polymer phosphite of the general formula:

$$C_6H_5O\left[\begin{array}{c}-P-X-P-XH \\ | \quad\quad | \\ X \quad\quad OC_6H_5 \\ |\end{array}\right]_3 H$$

wherein X is

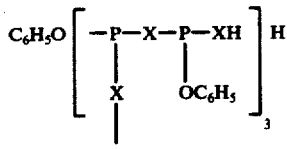

B. Weston 465 is a high molecular weight organic phosphite.

C. Weston 467 is a high molecular weight organic phosphite.

D. Weston 625 phosphite is dineodyl 25 - pentaerythritol diphosphite.

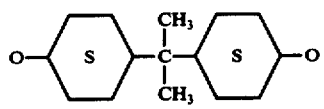

E. Weston 618 phosphite is distearyl-pentaerythritol disphosphite.

F. Weston TP24 is

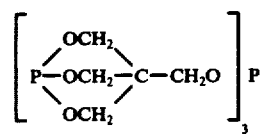

G. Weston 600 is diisodecylpentaerythritoldiphosphite.

H. Weston TPP is triphenyl phosphite and is not in accordance with this invention.

TABLE 1

| Antioxidant used (1%) | None | A | B | C | D | E | F | G | H |
|---|---|---|---|---|---|---|---|---|---|
| Elastic Modulus at 150° C | 24 | 21 | 24 | 24 | 22 | 21 | 23 | 20 | 0* |

*Sample H melted and flowed when heated to 150° C.

From the results shown in Table 1, it can be seen that the organic phosphites in accordance with this invention did not operate to prevent cross-linking upon irradiation. Alternatively, the triphenyl phosphite which is soluble and reactive upon irradiation so as not to be in accordance with this invention operated to prevent cross-linking of the polymer.

EXAMPLE II

The antioxidants of Example I were blended at the 3% by weight level with a high density polyethylene and pressed into slabs following the procedures of Example I.

The slabs were irradiated to a dose of 15 Mrads.

To evaluate antioxidant efficiency, ⅛ in. strips, 6 in. long were hung in a hot air circulating oven at 200° C. After varying periods of time, samples were withdrawn from the oven, allowed to cool for at least 4 hours to room temperature and then elongated in an Instron Tensile Tester. The initial jaw separation was 1 in. with an elongation rate of 2 in./minute. Jaw separation at rupture of the sample was to indicate ultimate elongation.

The number of hours of heat aging which resulted in rupture of the sample at or below 50% elongation on the Instron was selected as the failure point.

The results are summarized in Table 2.

TABLE 2

| Antioxidant | Hours of Heat Aging at 200° C to Failure |
|---|---|
| None | < 6 |
| A | 36 |
| B | 50 |
| C | 60 |
| D | 50 |
| E | 50 |
| F | 50 |
| G | 50 |
| H | 0* |

*Sample H melted and flowed when placed in oven at 200° C.

EXAMPLE III

All the phosphites mentioned in Example I were evaluated in CPE 2552 (Dow Chemical Co.) a chlorinated polyethylene (approximately chlorine content 25%) at the 2% by weight level and were irradiated to 20 megarads and tested as per Example I. The composition containing phosphite H melted and flowed when heated to 150° C. None of the other phosphites were found to inhibit radiation crosslinking to any significant extent. Furthermore phosphites A through G were effective stabilizers for the irradiated polymer.

EXAMPLE IV 3 pph by weight of antioxidant A was incorporated into Alathon 3170 (DuPont de Nemours Co.) an ethylene-vinyl acetate copolymer (density 0.94, M.I. 2) according to the procedures of Example I. After irradiation to a dose of 20 Mrads, the time to failure at 175° C was evaluated as described in Example I. Failure of the sample occurred after more than 15 days at 175° C. Comparable results were obtained with the phosphites B through G and with all these phosphites except H in ethylene-acrylic ester copolymers.

Other phosphorus antioxidant mixtures useful in polymer systems are found in my concurrently filed applications entitled "Antioxidant Comprising a Hydroxy Aromatic Compound Containing Sulfur and an Organic Phosphite", Ser. No. 405,553, filed Oct. 11, 1973, now U.S. Pat. No. 3,897,388 and "Antioxidant Comprising a Hydroxy Aromatic Compound Containing Sulfur and an Organic Phosphonate", Ser. No. 405,554, filed Oct. 11, 1973 and now abandoned.

I claim:

1. An irradiation cross-linked polymer composition, having improved resistance to oxidation, comprising a polymer selected from the group consisting of polyethylene, polypropylene, ethylene-vinyl acetate copolymer, ethylene-acrylic ester copolymers, ethylene-propylene copolymer, ethylene-propylene-diene terpolymer, polyvinyl chloride, polyvinylidene chloride, chlorinated polyethylene and polyolefin elastomers and minor effective amounts of an organic phosphite antioxidant which is substantially an insoluble compound under effective irradiating conditions of less than 50 mrads to which the composition has been subjected, said phosphite having the general formula $R_1O(ROPOR')_nA_x$ wherein the R and R' radicals may be the same or different, and may alone or in combination comprise the group consisting of alkyl, substituted alkyl, aryl, substituted aryl, and made together form a ring and contain further phosphite moieties, $R_1$ is alkyl, substituted alkyl, aryl, substituted aryl, or hydrogen and may contain further phosphite moieties and A is hydrogen or $OR_1$, wherein $n$ is 1 or 2, $x$ is 0 or 1.

2. An irradiation cross-linked polymer composition, comprising the group consisting of polyethylene polypropylene, ethylene-vinyl acetate copolymer, ethylene-acrylic ester copolymer, ethylene-propylene copolymer, ethylene-propylene-diene terpolymer, polyvinyl chloride, polyvinylidene chloride, chlorinated polyethylene and polyolefin elastomers and from 1 to 3% of an organic phosphite which is substantially an insoluble compound under irradiating conditions of 1 to 50 mrads to which the compositions has been subjected having the general formula $R_1O(ROPOR')_nA_x$ wherein the R and R' radicals may be the same or different, and may alone or in combination comprise the group consisting of alkyl, substituted alkyl, aryl, substituted aryl, and may together form a ring and contain further phosphite moieties, $R_1$ is alkyl, substituted alkyl, aryl, substituted aryl, or hydrogen and may contain further phosphite moieties and A is hydrogen or $OR_1$, wherein $n$ is 1 or 2, $x$ is 0 or 1.

3. The composition of claim 2 wherein each R and R' are $\frac{1}{2}[C(CH_2)_4]$ and where $n = 2$, R and R' form in combination $C(CH_2)_4$.

4. The composition of claim 2 wherein $A_x$ is equal to $OR_1$, wherein $x$ is 1 and $R_1$ is a $C_8$ to $C_{18}$ alkyl group.

5. The composition of claim 2 wherein R is equal to R' which is equal to $R_1$ and is $P(O\ CH_2)_3\ C$ wherein $n = 1$ and $x = 0$.

6. The composition of claim 5 wherein at least one OR or OR' either alone or in combination is a derivative of pentaerythritol.

7. The composition of claim 2 wherein the organic phosphite is distearyl pentaerythritol diphosphite.

8. The composition of claim 2 wherein the organic phosphite is dineodyl[25] penaerythritol diphosphite.

9. The composition of claim 2 wherein the organic phosphite is diisodecyl pentaerythritol diphosphite.

10. The composition of claim 2 wherein the organic phosphite has the formula:

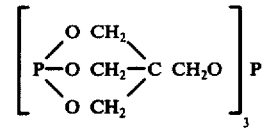

11. An irradiation cross-linked polymer composition, comprising the group consisting of polyethylene polypropylene, ethylene-vinyl acetate copolymer, ethylene-acrylic ester copolymer, ethylene-propylene copolymer, ethylene-propylene-diene terpolymer, polyvinyl chloride, polyvinylidene chloride, chlorinated polyethylene and polyolefin elastomers and from 1 to 3% of an organic phosphite which is substantially an insoluble compound under irradiating conditions of 1 to 50 mrads to which the compositions has been subjected having the general formula $(C\ (CH_2O)_4)_n\ P_x(OR'')_y$ wherein $n$ is 1 or 2, $y$ is 0 to 2, $x$ is 1 to 4 and each R'' is independently selected from the group consisting of alkyl, substituted alkyl, aryl, substituted aryl and hydrogen.

12. The composition of claim 11 wherein each R'' is independently selected from a $C_8$ to $C_{18}$ alkyl.

* * * * *